(12) United States Patent
Stoppelmann et al.

(10) Patent No.: US 9,950,499 B2
(45) Date of Patent: Apr. 24, 2018

(54) MULTILAYER STRUCTURE HAVING AT LEAST ONE METAL LAYER AND AT LEAST ONE POLYAMIDE LAYER

(71) Applicant: EMS-PATENT AG, Domat/Ems (CH)

(72) Inventors: Georg Stoppelmann, Bonaduz (CH); Gabriel Garcia, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 194 days.

(21) Appl. No.: 14/945,684

(22) Filed: Nov. 19, 2015

(65) Prior Publication Data

US 2016/0172074 A1 Jun. 16, 2016

(30) Foreign Application Priority Data

Dec. 11, 2014 (EP) .................................. 14197318

(51) Int. Cl.

| | | |
|---|---|---|
| *B32B 15/088* | (2006.01) | |
| *B32B 15/085* | (2006.01) | |
| *C09D 123/08* | (2006.01) | |
| *B32B 15/20* | (2006.01) | |
| *C09D 177/06* | (2006.01) | |
| *C08L 77/06* | (2006.01) | |
| *C09D 151/06* | (2006.01) | |
| *H01B 3/30* | (2006.01) | |
| *C08K 5/00* | (2006.01) | |

(52) U.S. Cl.
CPC .......... *B32B 15/088* (2013.01); *B32B 15/085* (2013.01); *B32B 15/20* (2013.01); *C08L 77/06* (2013.01); *C09D 123/0853* (2013.01); *C09D 123/0869* (2013.01); *C09D 123/0884* (2013.01); *C09D 151/06* (2013.01); *C09D 177/06* (2013.01); *H01B 3/305* (2013.01); *C08K 3/01* (2018.01); *C08K 5/0008* (2013.01)

(58) Field of Classification Search
CPC .......... C08L 77/00; C08L 77/02; C08L 77/06; C08L 33/064; C08L 33/068; C08L 33/08; C08L 33/10; C08L 33/12; C08L 23/08; C08L 23/0846; C08L 23/0884; C08L 23/14; C08L 23/18; C08L 23/20; C08L 23/22; B32B 15/082; B32B 15/088
See application file for complete search history.

(56) References Cited

U.S. PATENT DOCUMENTS

| | | | | |
|---|---|---|---|---|
| 4,552,819 A | * | 11/1985 | Hibino | .................. C09J 123/08 428/516 |
| 6,207,745 B1 | | 3/2001 | Bersted et al. | |
| 6,235,361 B1 | | 5/2001 | Jacquemet et al. | |
| 6,291,024 B1 | | 9/2001 | Deroch et al. | |
| 2001/0023537 A1 | | 9/2001 | Gahlmann et al. | |
| 2004/0028921 A1 | | 2/2004 | Amouroux | |
| 2007/0128442 A1 | * | 6/2007 | Buehler | ............... C08K 5/0008 428/411.1 |
| 2012/0234682 A1 | * | 9/2012 | Dubois | .................... C25D 3/38 205/50 |
| 2015/0291795 A1 | * | 10/2015 | Aepli | ..................... C08L 77/08 524/151 |

FOREIGN PATENT DOCUMENTS

| | | |
|---|---|---|
| DE | 697 04 007 T2 | 6/2001 |
| DE | 695 26 745 T2 | 11/2002 |
| DE | 10 2007 003 327 A1 | 7/2008 |
| DE | 10 2007 054 004 A1 | 5/2009 |
| EP | 1 351 000 A1 | 10/2003 |
| EP | 2 746 342 A1 | 6/2014 |
| WO | 2014/170148 A1 | 10/2014 |

OTHER PUBLICATIONS

Search Report for EP 14197318.0 dated Apr. 23, 2015.

* cited by examiner

*Primary Examiner* — Marc S Zimmer
(74) *Attorney, Agent, or Firm* — Sughrue Mion, PLLC

(57) ABSTRACT

A layer structure having at least one metal element and at least one polyamide layer arranged at least regionally on the metal element, the structure preferably comprising an insulated electrical conductor wherein The polyamide layer consists of a polyamide molding composition consisting of the following components: (a) a polyamide based on cycloaliphatic diamines or cycloaliphatic dicarboxylic acids having a glass transition temperature (Tg) of at 130° C.; (b) a polyolefin based on C2-C12 alkenes, and additionally on at least one monomer selected from the following group: maleic anhydride, itaconic anhydride, glycidyl acrylate, butene, propylene, glycidyl methacrylate, acrylic acid, methacrylic acid, vinyl acetate, C1-C12 alkyl (meth)acrylates, substituted or unsubstituted styrene, or a mixture of such monomers; (c) optionally an aliphatic polyamide different from (a), or a mixture of such polyamides; (d) optionally additives.

30 Claims, 1 Drawing Sheet

MULTILAYER STRUCTURE HAVING AT LEAST ONE METAL LAYER AND AT LEAST ONE POLYAMIDE LAYER

TECHNICAL FIELD

The present invention relates to multilayer structures having at least one metal layer and at least one polyamide layer, more particularly as or for use as insulated electrical conductors, and also to the use of polyamides for coating metals.

PRIOR ART

Metallic wires of copper or aluminium, for example, are widely employed as conductors, for example, for the transmission of electricity or for windings, as for instance in automobiles, electrical motors, three-phase motors and transformers, etc. The wires are provided on their surface with an electrical insulating coating, for protecting and insulating the conductors—for example, for protecting and insulating individual turns of wire from one another, in order to prevent a short-circuit. For protection from damage and for insulation, therefore, metallic conductors are frequently coated or enameled with polymeric layers. The insulating layers are to have high scratch resistance and adhesive strength and also high resistance towards abrasion, but must also be sufficiently flexible; in other words, on bending and corresponding stretching of the wires as part of further processing, the coating ought not to suffer rupture. A coating of this kind ought also to remain stable on contact with water, salt solutions and chemicals, particularly fuels and oils, especially in the automotive sector.

US-A-2004/0028921 relates to coated metal surfaces, particularly for metal line pipes in the automotive sector, for brake fluids, for example, where the metal is first provided with optional primer coats or adhesion promoter coats, before a coat is applied that is composed of a mixture of polyamide and carboxylic anhydride-modified polyolefins. The metal may be aluminium; polyamide cited is semicrystalline polyamide such as PA11 and PA12, for example, and also further aliphatic polyamides.

EP-A-1 351 000 describes steel fuel lines coated optionally with aluminium that are provided by extrusion with a layer of PA12.

US-A-2001/0023537 relates to extrusion-coated metal articles, for which the metal is coated first with an organic silane compound and subsequently with a polyamide. Polyamides cited include a wide selection of customary polyamides, without special preference.

An example of the coating of metals with polyamide powders in a fluidized-bed sintering process is described in DE-T-697 04 007 and in DE-T-695 26 745. After the metal has been coated, the polyamide powder is melted by effect of heat, to give a coherent plastics coating on the metal. Steel plates are coated with PA11, with optional use of fillers. DE-A-10 2007 054 004 describes metal composites composed of a metallic base profile and one or two partly overlapping plastics profiles. Cited specifically are polyamides PA6 and PA66 for plastics element A, and polyamide PA12 for plastics element B. U.S. Pat. No. 6,291,024 describes coated metal surfaces where the structure consists in succession of a metal, a layer of thermoplastic polyurethane and a layer of a different thermoplastic. Adhesion promoter layers may optionally be employed. A structure of this kind is used in the context of pipes, electrical cables and telecommunications cables. Thermoplastics mentioned include polyamides and polyolefins.

A very similar patent is U.S. Pat. No. 6,235,361. It describes a structure wherein first a layer of epoxy resin is on the metal surface, followed by a polypropylene-based adhesion promoter layer, and in turn by a layer of thermoplastic. Possible thermoplastics include polyamide. EP-A-2 746 342 discloses the use of a polyamide moulding compound for producing a stain-resistant article for which the staining propensity (SP) is at least 2. This compound contains 30-100 wt % of a polyamide or of a polyamide mixture consisting of 50-100 wt % of at least one amorphous or microcrystalline polyamide having a glass transition temperature of at least 100° C., based on a cycloaliphatic diamine and on aromatic or aliphatic dicarboxylic acids having at least 6 carbon atoms.

DE 10 2007 003327 discloses a film comprising the following layers: I. A layer based on a polyamide whose monomer units contain on average at least 8 C atoms, II. An immediately adjacent layer of a moulding compound which comprises a polyamide as I. and also a copolymer which possesses functional groups. The film is used for producing a bonded assembly with a substrate that comprises PA6, PA66, PA6/66 or PPA, resulting in firm adhesion.

WO-A-2014170148 describes the use of thermoplastic moulding compounds, comprising a thermoplastic polyamide, red phosphorus, a dialkylphosphinic salt and an ethylene copolymer, as impact modifiers for producing flame-retardant mouldings with glow wire resistance.

DESCRIPTION OF THE INVENTION

It is one object of the present invention, accordingly, to provide an improved layer structure having a metal element and a polyamide layer arranged at least regionally on the metal element. This layer structure ought in particular in the form of an electrical conductor to have high resistance with respect to storage in a salt solution under electrical voltage and at elevated temperature over an extended time period, and even under these conditions ought not to exhibit any deleterious properties in respect of adhesion and in respect of fragility of the polyamide layer.

According to the invention, this object is achieved inter alia by a layer structure according to claim 1 and, respectively, by the uses that are proposed.

The present invention relates specifically to a layer structure having at least one metal element and at least one polyamide layer arranged at least regionally on the metal element, said structure being characterized in that the polyamide layer consists of a polyamide moulding composition which is a mixture. This mixture consists of components (a) and (b) below, and also optionally (c) and/or (d):

(a) a—preferably amorphous-polyamide based on cycloaliphatic diamines, cycloaliphatic dicarboxylic acids, or both cycloaliphatic diamines and cycloaliphatic dicarboxylic acids, or a mixture of such preferably amorphous polyamides, having a glass transition temperature (Tg) of at least 130° C.;

(b) a polyolefin based on C2-C12 alkenes, preferably based on C2-C8 or C2-C5 alkenes, in branched or unbranched form, or a mixture thereof, and additionally at least one monomer selected from the following group: maleic anhydride, itaconic anhydride, glycidyl acrylate, glycidyl methacrylate, acrylic acid, methacrylic acid, vinyl acetate, C1-C12 alkyl acrylates, preferably ethyl acrylate or butyl acrylate, C1-C12 alkyl methacrylates, substituted or unsubstituted styrene, or a mixture of such monomers;

(c) an aliphatic polyamide different from (a), or a mixture of such polyamides;
(d) additives.

This is with the proviso that the fraction of components (c) and (d) may also be zero (these components are therefore optional), and with the proviso that the sum of components (a)-(d) makes 100 wt %, i.e. there are no components other than components (a) and (b) and optionally (c) and/or (d).

The concept of the alkenes embraces aliphatic hydrocarbons which are composed of carbon and hydrogen and which possess, at any desired position, at least one carbon-carbon double bond in the molecule. Included accordingly are also polyenes such as dienes and trienes, but the concept of the alkenes does not include aromatic hydrocarbon systems, i.e. ring systems having double bonds which are conjugated according to the Hückel rule. In actual fact it is found that the known coatings comprising polyamide 12 do not pass the test for electrical conductors, especially in the automotive sector, in a salt solution at elevated temperature under electrical voltage and over extended time periods such as 1000 hours, for example. In the case of an aluminium conductor coated with a polyamide layer of polyamide 12, ions migrate through the polyamide layer to the aluminium conductor, allowing electrochemical events to unfold in the aluminium. The electrochemical events, the chemical substances formed in such events, and the subsequent reactions of these substances with the aluminium, such as formation of aluminium chloride or aluminium hydroxide, for example, and with the polyamide layer, lead to a reduction in the adhesion between metal element and polyamide layer and to degradation of the polyamide layer. Ultimately, therefore, all of these events may lead to partial detachment of the cladding layer from the metal element and damage to the cladding, which becomes apparent in cracking or even in local flaking of the cladding, thereby negating the insulating effect of the cladding. Conductors with a coating of polyamide 12 are unable accordingly to meet these new, more exacting requirements.

The preferably amorphous component (a) that is now proposed solves these problems per se, and results in sufficient adhesion on the metallic conductor, but without the additional presence of component (b), coatings of this kind made from component (a) lack sufficient flexibility and are too brittle. It is therefore the specific combination of components (a) and (b), and also, optionally, of further components (c) and/or (d), which are able to ensure the properties according to the invention, as are documented further on below, in particular, in the working examples.

According to preferred embodiments, the polyamide moulding composition is a mixture of the stated components (a)-(d) with the following proportions, where the ranges indicated for components (a)-(d) may be selected individually or in combination, and where the stated weight fractions are always based on the overall sum total of (a)-(d):

Component (a) is present in a fraction of 60-90 wt %, preferably 65-90 wt %.
Component (b) is present in a fraction of 10-40 wt %, preferably 10-20 wt %.
Component (c) is present in a fraction of 0-20 wt %, preferably 10-20 wt %.
Component (d) is present in a fraction of 0-25 wt %, preferably 0.1-5 wt %. Component (a) is a polyamide based on cycloaliphatic diamines, cycloaliphatic dicarboxylic acids, or both cycloaliphatic diamines and cycloaliphatic dicarboxylic acids, or a mixture of such amorphous polyamides, having a glass transition temperature (Tg) of at least 130° C.

Component (a) consists preferably of polyamides which have a glass transition temperature of at least 140° C. or, furthermore, preferably 150° C., but preferably possess a glass transition temperature of not more than 220° C. or not more than 200° C. Especially preferred are polyamides of component (a) whose glass transition temperature, determined at an equilibrium moisture content achieved after conditioning in accordance with ISO 1110 (storage of the samples for 14 days at 70° C. and 62% relative humidity), is at least 85° C., preferably at least 90° C. and more preferably at least 100° C. This is especially advantageous because the use of such polyamides (a), with a glass transition temperature on contact with water that does not fall beneath the stated temperature limits, is able largely to suppress the aforementioned adverse electrochemical events, and consequently, in the "Electrical Properties on Water Storage" test, the adhesion between metal element and polyamide layer is retained and the degradation of the polyamide layer is minimized. The glass transition temperature here is determined on the pellets, on the basis of ISO Standard 11357-11-2. The Differential Scanning calorimetry (DSC) here is carried out with a heating rate of 20° C./min. For the glass transition temperature (Tg), the temperature reported is that for the middle step or for the point of inflection.

Both the polyamides (a), particularly if not yet admixed with dyes or pigments, of preferred compositions are transparent in the wavelength range visible for the human eye. Transparent in this context means that shaped parts comprising the polyamides of component (a) alone have a high light transmittance (LT) of at least 85%, preferably at least 88% and especially of more than 90%. The value of the light transmittance which is used as a measure of the transparency, should be understood always, in the context of the present application, as that determined by method ASTM D1003 (illuminant CIE-C). The light transmittance is measured, for example, on an instrument bearing the name Haze Guard Plus from BYK Gardner (DE) on circular plates of 70×2 mm or on plates with dimensions of 60×60×2 mm. For the visible wavelength range, the transmission value is defined according to CIE-C, i.e. with substantial intensities approximately between 400 and 770 nm. The circular plates of 70×2 mm for this purpose, for example, can be produced on an Arburg injection moulding machine in a polished mould, with the barrel temperature being between 200° C. and 340° C. and the mould temperature between 20° C. and 140° C.

The polyamides of component (a) preferably have no measurable heats of fusion (melting enthalpy) or only very low heats of fusion, of not more than 25 J/g, preferably of not more than 20 J/g, preferably of not more than 4 J/g (determined according to ISO 11357-11-2 on pellets, Differential Scanning calorimetry (DSC) with a heating rate of 20° C./min). The concentration of the cycloaliphatic diamine in component (a) is preferably at least 20 mol %, more particularly at least 40 mol % and very preferably at least 50 or 60 mol %, based on the sum of all diamines present in (a). Particular preference is given to a concentration of the cycloaliphatic diamines in the range from 60 to 100 mol %, based on the sum of all the diamines of component (a).

Cycloaliphatic diamines that are suitable in relation to component (a) (component (a1)) are those having 6 to 24 carbon atoms, such as, for example, bis(4-amino-3-methyl-cyclohexyl)methane (MACM), bis(4-aminocyclohexyl)methane (PACM), bis(4-amino-3-ethylcyclohexyl)methane (EACM), bis(4-amino-3,5-dimethylcyclohexyl)methane (TMDC), 2,6-norbornanediamine or 2,6-bis(aminomethyl)

norbornane, or 1,3-diaminocyclohexane, 1,4-diaminocyclohexanediamine, isophoronediamine, 1,3-bis(aminomethyl)cyclohexane (BAC), 1,4-bis(aminomethyl)cyclohexane, 2,2-(4,4'-diaminodicyclohexyl)propane (PACP) or mixtures thereof. Especially preferred is alkyl-substituted bis(aminocyclohexyl)methane or bis(aminocyclohexyl)propane. Alkyl substituents preferred are linear and/or branched C1-C6, preferably C1-C4 alkyl groups, thus in particular methyl, ethyl, propyl, isopropyl or butyl groups, with methyl groups being especially preferred. One particularly preferred embodiment uses as alkyl-substituted bis(aminocyclohexyl)methane bis(4-amino-3-methyl-cyclohexyl)methane (MACM) and bis-(4-amino-3,5-dimethylcyclohexyl)methane (TMDC). Particularly preferred are the cycloaliphatic diamines BAC, PACM, MACM and TMDC.

Besides the cycloaliphatic diamines it is also possible, to a limited extent, to use other aliphatic and aromatic diamines to construct the polyamides (a) (component (a2)), such as, for example, 1,4-butanediamine, 1,5-pentanediamine, 2-methyl-1,5-pentanediamine, 2-butyl-2-ethyl-1,5-pentanediamine, 1,6-hexanediamine, 2,2,4-trimethylhexamethylene-diamine, 2,4,4-trimethylhexamethylenediamine, 1,8-octanediamine, 2-methyl-1,8-octanediamine, 1,9-nonanediamine, 1,10-decanediamine, 1,11-undecanediamine, 1,12-dodecanediamine, 1,13-tridecanediamine, 1,14-tetradecanediamine, m-xylylenediamine and p-xylylenediamine. Especially preferred are unbranched (straight-chain) aliphatic diamines having 6-12 carbon atoms, more particularly 1,6-hexanediamine, 1,10-decanediamine and 1,12-dodecanediamine. These other diamines within component (a), however, preferably make up not more than 80 mol % of the entirety of the diamines of component (a), and preferably they do not make up more than 60 mol %, especially preferably not more than 40 mol %, of the entirety of the diamines of component (a). With more particular preference component (a) is substantially free from such further, other diamines which are not cycloaliphatic.

Dicarboxylic acids (component (a3)) suitable for the polyamide (a) are as follows: adipic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, C36 dimer fatty acid, isophthalic acid, terephthalic acid, naphthalenedicarboxylic acid, cis- and/or trans-cyclohexane-1,4-dicarboxylic acid and/or cis- and/or trans-cyolohexane-1,3-dicarboxylic acid (CHDA) and mixtures thereof. Preferred are aromatic dicarboxylic acids and straight-chain aliphatic dicarboxylic acids. Especially preferred are the dicarboxylic acids terephthalic acid, isophthalic acid, sebacic acid and dodecanedioic acid. Particularly preferred is a polyamide (a) whose fraction of terephthalic acid is not more than 50 mol %, based on the sum of all dicarboxylic acids of component (a). It is preferred more particularly if the fraction of terephthalic acid in component (a) is less than 45 mol % or there is no terephthalic acid present in components (a).

As further monomers, the polyamides (a) may also comprise lactams or aminocarboxylic acids (component (a4)), more particularly α,ω-amino acids or lactams having 6 to 12 carbon atoms, the following selection representing an example: m-aminobenzoic acid, p-aminobenzoic acid, caprolactam (CL), α,ω-aminocaproic acid, α,ω-aminoheptanoic acid, α,ω-aminooctanoic acid, α,ω-aminononanoic acid, α,ω-aminodecanoic acid, α,ω-aminoundecanoic acid (AUA), laurolactam (LL) and α,ω-aminododecanoic acid (ADA). Particularly preferred are caprolactam, α,ω-aminocaproic acid, laurolactam, α,ω-aminoundecanoic acid and α,ω-aminododecanoic acid. The fraction of lactams or amino acids in component (a4) is 0 to 50 mol %, preferably 2-45 mol % and more preferably 3 to 35 mol %, based in each case on the sum of all (a)-forming monomers, with the concentration of the cycloaliphatic diamine, based on all of the diamines in component (a), being always at least 20 mol %, preferably always at least 40 mol % and more preferably always at least 60 mol % or at least 80 mol %. According to one particularly preferred embodiment, the (preferably amorphous) polyamide or polyamides of component (a) is or are made up of the following building blocks:

(a1) 50 to 100 mol %, or 60 to 100 mol %, preferably 80-100 wt %, of a cycloaliphatic diamine, preferably selected from the group consisting of: bis(4-amino-3-methylcyclohexyl)methane (MACM), bis(4-aminocyclohexyl)methane (PACM), bis(4-amino-3-ethylcyclohexyl)methane (EACM), bis(4-amino-3,5-dimethylcyclohexyl)methane (TMACM), 1,3-bis(aminomethyl)cyclohexane (BAC), 1,4-bis(aminomethyl)cyclohexane or mixtures thereof and (a2) 0 to 50 mol % or 0-40 mol % of an aliphatic or aromatic diamine having 4 to 36 carbon atoms, or mixtures thereof, based in each case on the molar entirety of diamines, and (a3) one or more than one aliphatic or cycloaliphatic dicarboxylic acid having 4 to 36 carbon atoms, preferably 10-36 or 6-18 carbon atoms, (a4) one or more than one aliphatic or aromatic lactam or aminocarboxylic acid having 4-36 carbon atoms, preferably 10-36 or 10-18 carbon atoms, the fraction of component (a4) being preferably 0 to 50 mol %, especially preferably 2-45 mol % and more preferably 3 to 35 mol %, based in each case on the sum of all monomers forming (a).

Preferred polyamides (a) based on cycloaliphatic diamines are MACM9, MACM10, MACM11, MACM12, MACM13, MACM14, MACM16, MACM18, PACM9, PACM10, PACM11, PACM12, PACM13, PACM14, PACM16, PACM18, TMDC9, TMDC10, TMDC11, TMDC12, TMDC13, TMDC14, TMDC15, TMDC16, TMDC17, TMDC18 or copolyamides, such as, for example, MACMI/12, MACMT/12, MACMI/MACMT/12, 6I/6T/MACMI/MACMT/12, 6I/MACMI/MACMT, 6I/PACMI/PACMT, 6I/6T/MACMI, MACMI/MACM36, 12/PACMI or 12/MACMT, 6/PACMT, 6/IPDT, 10I/10T/BACI/BACT or mixtures thereof, MACM9-18/PACM9-18, MACM9-18/TMDC9-18, TMDC9-18/PACM9-18 more particularly MACM10/PACM10, MACM12/PACM12 and MACM14/PACM14, and mixtures thereof.

Component (b) comprises a polyolefin based on C2-C12, preferably C2-C8, more preferably C2-C5 alkens, in branched or unbranched form or a mixture thereof, and additionally at least one monomer selected from the following group: maleic anhydride, itaconic anhydride, glycidyl acrylate, glycidyl methacrylate, acrylic acid, methacrylic acid, vinyl acetate, C1-C12 alkyl acrylates, preferably ethyl acrylate or butyl acrylate, C1-C12 alkyl methacrylates, substituted or unsubstituted styrene, or a mixture of such monomers. The monomer selected from the following group: maleic anhydride, itaconic anhydride, glycidyl acrylate, glycidyl methacrylate, acrylic acid, methacrylic acid, vinyl acetate, C1-C12 alkyl acrylates, preferably ethyl acrylate or butyl acrylate, C1-C12 alkyl methacrylates, substituted or unsubstituted styrene, or a mixture of such monomers may be incorporated either into the main chain, based on polyolefin, or as part of side chains, as for example via a grafting reaction. The polymers in question may also be terpolymers. Component (b) is based on the C2-C12, preferably C2-C8, more preferably C2-C5 alkenes, in branched or unbranched form or a mixture thereof, and additionally on at least one monomer selected from the stated group. Accordingly, component (b) may also have other monomer building blocks, again either in the main chain or attached via a grafting reaction. According to one preferred embodiment, component (b) is exclusively constructed from the C2-C12, preferably C2-C8, more preferably C2-C5 alkenes, in branched or unbranched form or a mixture thereof, and additionally from at least one monomer selected from the stated group composed of maleic anhydride, itaconic anhydride, glycidyl acrylate, glycidyl methacrylate, acrylic acid, methacrylic acid, vinyl acetate, C1-C12 alkyl acrylates, preferably ethyl acrylate or butyl acrylate, C1-C12 alkyl methacrylates, substituted or unsubstituted styrene or a mixture of such monomers, i.e. component (b) is free from further, other comonomers.

If component (b) is exclusively constructed from the stated alkenes, then it is preferably in combination with, additionally, at least one monomer selected from the following reduced group: maleic anhydride, itaconic anhydride, glycidyl acrylate, glycidyl methacrylate, acrylic acid, methacrylic acid, vinyl acetate, C1-C12 alkyl acrylates, preferably ethyl acrylate or butyl acrylate, C1-C12 alkyl methacrylates or a mixture thereof. According to a further embodiment, which is preferred, component (b) is in this case exclusively constructed from alkenes selected from the following group: ethene, propene, 1-butene, 2-butene, 1-pentene, 2-pentene, and additionally, at least one monomer selected from the reduced group indicated above.

Possible and further preferred, moreover, are systems for component (b) which are constructed exclusively from the C2-C12, preferably C2-C8, more preferably C2-C5 alkenes, in branched or unbranched form or a mixture thereof, and additionally from styrene and additionally at least one monomer selected from the reduced group indicated above.

Preferably the concentration of (b) is in the range from 10 to 40 wt %, more particularly in the range from 10 to 20 wt %, based on the sum of components (a) and (b), and also, if present, of component (c) and/or (d). Below 10 wt %, the effect of component (b) is small, and so the advantages of component (b) are hardly felt in the moulding compositions; above 40 wt %, the stiffness reduces greatly and, on account of an excessive melt viscosity (excessively low MVR values), the moulding composition can no longer be adequately processed.

Component (b) therefore also comprises polymers which carry carboxylic acid, carboxylic anhydride or epoxy groups in the side chain. Preferred are copolymers or graft copolymers constructed from carboxylic acid or carboxylic anhydride group- or epoxy group-containing monomers and from at least one further monomer, with both groups of monomers including at least one polymerizable carbon-carbon double bond.

Preferred epoxy group-containing monomers are glycidyl acrylate and glycidyl methacrylate. Preferred carboxylic acid group-containing monomers are acrylic acid and methacrylic acid. Preferred carboxylic anhydride group-containing monomers are maleic anhydride and itaconic anhydride.

Used preferably as component (b), then, are copolymers of glycidyl acrylate and/or glycidyl methacrylate and at least one further unsaturated alkene monomer containing at least one non-aromatic carbon-carbon double bond, in other words being an olefinically unsaturated monomer. Preferably component (b) is a copolymer of glycidyl acrylate and/or glycidyl methacrylate and at least one further olefinically unsaturated alkene monomer, with the concentration of glycidyl acrylate and glycidyl methacrylate being in the range from 5 to 20 wt %, preferably in the range from 6 to 16 wt % and more preferably in the range from 7 to 14 wt %, based on the copolymer. If there is less than 5 wt % of glycidyl acrylate or glycidyl methacrylate present in the copolymer, the reactivity of component (b) is generally too low and the desired mechanical properties are not obtained. If the glycidyl acrylate or glycidyl methacrylate concentration of component (b) exceeds a concentration of 15 wt %, the processing qualities, the surface quality and the mechanical properties generally become increasingly poorer.

It is preferred, furthermore, if the further olefinically unsaturated monomer is a monounsaturated olefin, preferably an α-olefin, having 2 to 8, more particularly having 2 to 5, carbon atoms. In particular, besides glycidyl acrylate and/or glycidyl methacrylate, the copolymer (b) comprises at least one further olefinically unsaturated alkene monomer selected from the group consisting of ethene, propene, 1-butene, 2-butene, 1-pentene, 2-pentene, or a mixture thereof. Examples of suitable diene monomers in the sense of the alkene monomers include 1,3-butadiene, 2-methyl-1,3-butadiene, 2,3-dimethyl-1,3-butadiene, 1,3-pentadiene and isoprene. 1,3-Butadiene and isoprene are preferred, especially 1,3-butadiene (referred to for short below as butadiene). Likewise possible are systems based on mixtures of such diene monomers with alkenes having only one double bond.

With particular preference component (b) is a copolymer of glycidyl methacrylate and ethene and also, optionally, further olefinically unsaturated alkene monomers, with the ethene content being preferably in the range from 50 to 95 wt %, preferentially in the range from 65 to 93 wt % and more preferably in the range of 80-95 or 85 to 94.

Specific examples are copolymers of ethylene and glycidyl acrylate; ethylene and glycidyl methacrylate; ethylene, methyl methacrylate and glycidyl methacrylate; ethylene, methyl acrylate and glycidyl methacrylate; ethylene, ethyl acrylate and glycidyl methacrylate; ethylene, butyl acrylate and glycidyl methacrylate; ethylene, vinyl acetate and glycidyl methacrylate.

Particularly preferred for component (b) are the following copolymers:
  of ethylene and glycidyl methacrylate, with a glycidyl methacrylate content of 7 to 14 wt %, based on the sum of all the monomers in the copolymer;
  of 71-88 wt % ethylene, 5-15 wt % vinyl acetate and 7-14 wt % glycidyl methacrylate, based on the sum of all the monomers in the copolymer;
  of 56-73 wt % ethylene, 20-30 wt % methyl acrylate and 7-14 wt % glycidyl methacrylate, based on the sum of all the monomers in the copolymer;
  of 51-78 wt % ethylene, 15-35 wt % butyl acrylate and 7-14 wt % of glycidyl methacrylate, based on the sum of all the monomers in the copolymer.

Speaking generally, therefore, component (b) is preferably a copolymer of glycidyl acrylate and/or glycidyl methacrylate and of at least one further unsaturated alkene monomer having at least one carbon-carbon double bond, with the concentration of glycidyl acrylate, glycidyl methacrylate or a mixture thereof being preferably in the range from 5 to 15 wt %, preferentially in the range from 7 to 14 wt %, based on the sum of all the monomers in the copolymer. The further unsaturated monomer may be a monounsaturated olefin, preferably an α-olefin, having 2 to 5 carbon atoms, and component (b) may additionally comprise, as a building block, a styrene, including derivatives thereof.

According to one especially preferred embodiment, component (b) is a copolymer of glycidyl methacrylate and ethene and also, optionally, of further olefinically unsaturated alkene monomers, with the alkene content, preferably ethene content, being in the range from 50 to 95 wt %, preferentially in the range from 65 to 93 wt %.

For component (b), the melt flow rate (MFR), determined in accordance with ISO 1133 at 190° C. under a load of 2.16 kg, is in the range of 2-20 g/10 min, preferentially in the range of 3-15 g/10 min.

Particularly preferred examples of components (b) which can be used in accordance with the invention are the systems available from Arkema under the product name Lotader AX, especially of type AX8840 (copolymer of 92% ethene and 8% glycidyl methacrylate) or of the type AX8900 (copolymer of 67% ethene, 25% methyl acrylate and 8% glycidyl methacrylate). Likewise preferred are products of the Elvaloy type from DuPont, especially Elvaloy PTW (copolymer of 67% ethene, 28% butyl acrylate and 5% glycidyl methacrylate), and also products of the Igetabond type available from Sumitomo, especially Igetabond E (copolymer of 88% ethene and 12% glycidyl methacrylate).

Component (b) further preferably comprises copolymers or graft copolymers which comprise unsaturated carboxylic acids, dicarboxylic acids or carboxylic anhydrides as monomer, meaning either that these carboxylic acids, dicarboxylic acids or carboxylic anhydrides are polymerized with further comonomers to form the copolymer (b), or that a graft base based on other monomers has been modified by grafting with unsaturated carboxylic acids, dicarboxylic acids or carboxylic anhydrides. Hereinafter, therefore, component (b) is also referred to as MAH-modified impact modifier or in short form as MAH-IMP.

Further examples of those copolymers or graft copolymers which may find use as a constituent of component (b) or which entirely form component (b) are a polybutadiene, polyisoprene, polyisobutylene, a copolymer of butadiene and/or isoprene with styrene or styrene derivatives and other comonomers, a hydrogenated copolymer and/or a copolymer formed by grafting or copolymerization with acid anhydrides, (meth)acrylic acid and esters thereof. The copolymer forming the basis of the component (b) may also be a graft rubber with a crosslinked elastomeric core, which consists of butadiene or isoprene and has a graft shell of polystyrene, and an apolar or polar olefin homopolymer and copolymer such as ethylene-propylene rubber or ethylene-propylene-diene rubber, or an apolar or polar olefin homopolymer and copolymer formed by grafting or copolymerization with acid anhydrides (meth)acrylic acid and esters thereof. The copolymer may also be a carboxylic acid-functionalized copolymer such as poly(ethene-co-(meth)acrylic acid) or poly(ethene-co-1-olefin-co-(meth)acrylic acid), where the 1-olefin is an alkene or an unsaturated (meth)acrylic ester having more than 4 atoms, including copolymers in which some of the acid groups are neutralized with metal ions.

Preferred copolymers based on styrene monomers (styrene and styrene derivatives) are block copolymers composed of alkenylaromatic compounds and an alkene, preferably conjugated diene, and also hydrogenated block copolymers of the alkenylaromatic compound and alkenes, preferably conjugated dienes, or combinations of these IMP types. The block copolymer comprises at least one block derived from the alkenylaromatic compound and at least one block derived from an alkene, preferably conjugated diene. In the hydrogenated block copolymers, the fraction of aliphatically unsaturated carbon-carbon double bonds has been reduced by hydrogenation. Suitable block copolymers are two-, three- or four- and poly-block copolymers with linear structure. However, branched and star-shaped structures can likewise be used in accordance with the invention. Branched block copolymers are obtained in a known way, by, for example, graft reactions of polymeric "side branches" onto a polymer main chain.

As alkenylaromatic monomers it is also possible, alongside or in a mixture with styrene, to use vinyl aromatic monomers, which are substituted on the aromatic ring and/or on the C═C double bond by C1-20 or C1-C10 hydrocarbon radicals or halogen atoms.

Examples of alkenylaromatic monomers under the heading of substituted or unsubstituted styrene are preferably unsubstituted styrene, p-methylstyrene, α-methylstyrene, ethylstyrene, tert-butylstyrene, bromostyrenes, chlorostyrenes, and combinations thereof. Those preferred are unsubstitued styrene, p-methylstyrene, alpha-methylstyrene, ethylstyrene, tert-butylstyrene, or mixtures thereof. Particular preference is given to using styrene.

Used with preference as alkenylaromatic monomer is styrene and as alkene, preferably diene monomer, is butadiene; in other words, the styrene-butadiene block copolymer is preferred. In general the block copolymers are prepared by anionic polymerization in a conventional way.

Additionally, further to the styrene and diene monomers, it is possible for further comonomers to be used. The fraction of the comonomers is preferably 0 to 50, more preferably 0 to 30 and more particularly 0 to 15 wt %, based on the total amount of the monomers used. Examples of suitable comonomers are acrylates, especially C1-12 alkyl acrylates such as n-butyl acrylate or 2-ethylhexyl acrylate, and the corresponding methacrylates, especially C1-12 alkyl methacrylates such as methyl methacrylate (MMA). Further possible comonomers are (meth)acrylonitrile, glycidyl (meth)acrylate, vinyl methyl ether, diallyl and divinyl ethers of difunctional alcohols, divinylbenzene and vinyl acetate. C1-12 Alkyl acrylates and C1-12 alkyl methacrylates are collectively designated C1-12 alkyl (meth)acrylates.

In addition to the conjugated diene, the hydrogenated block copolymers may further comprise fractions of lower hydrocarbons such as ethylene, propylene, 1-butene, dicyclopentadiene or non-conjugated dienes. In the hydrogenated block copolymers, the fraction of the non-reduced aliphatic unsaturated bonds is less than 50%, preferably less than 25%, more particularly less than 10%. The aromatic fractions are reduced to an extent of not more than 25%. The hydrogenated block copolymers styrene-(ethylene-butylene) or styrene-(ethylene-propylene) diblock and styrene-(ethylene-butylene)-styrene triblock copolymers are obtained by hydrogenation of styrene-butadiene and styrene-butadiene-styrene copolymers.

The block copolymers consist preferably to an extent of 20 to 90 wt % of aromatic block, more particularly to an extent of 50 to 85 wt % of aromatic block. The diene may be incorporated in 1,2 or in 1,4 orientations into the conjugated diene fraction. The molar mass of component (b), preferably in the form of block copolymers, is 5000 to 500 000 g/mol, preferably 20 000 to 300 000 g/mol, more particularly 40 000 to 200 000 g/mol.

Suitable hydrogenated block copolymers are the polymers available commercially, such as, for example, KRATON® (Kraton Polymers) G1650, G1651, and G1652, and also TUFTEC® (Asahi Chemical) H1041, H1043, H1052, H1062, H1141 and H1272. Examples of non-hydrogenated block copolymers are polystyrene-polybutadiene, polystyrene-poly(ethylene-propylene), polystyrene-polyisoprene, poly(α-methylstyrene-polybutadiene, polystyrene-polybutadiene-polystyrene (SBS), polystyrene-poly(ethylene-propylene)-polystyrene, polystyrene-polyisoprene-polystyrene and poly(α-methylstyrene-polybutadiene-poly(α-methylstyrene), and combinations thereof.

Suitable non-hydrogenated block copolymers which are available commercially are various products with the brand names SOLPRENE® (Phillips), KRATON® (Shell), VECTOR® (Dexco) and SEPTON® (Kuraray).

According to a further preferred embodiment, the moulding compositions of the invention are characterized in that component (b) is a polyolefin homopolymer or an ethylene-α-olefin copolymer, especially preferably a EP and/or EPDM elastomer (ethylene-propylene rubber and ethylene-propylene-diene rubber, respectively). The elastomer in question may be, for example, an elastomer based on an ethylene-C3-12 α-olefin copolymer with 20 to 96, preferably 25 to 85, wt % ethylene, in which case, with particular preference, the C3-12 α-olefin is an olefin selected from the group propene, 1-butene, 1-pentene, 1-hexene, 1-octene, 1-decene and/or 1-dodecene, and with particular preference component (b) is a grafted ethylene-propylene or ethylene-butylene rubber and/or LLDPE and/or VLDPE. Alternatively or additionally (in a mixture, for example), (b) may be a terpolymer based on ethylene C3-12 α-olefin with a non-conjugated diene, this terpolymer preferably comprising 25 to 85 wt % ethylene and a non-conjugated diene in an amount not more than in the region of 10 wt %, in which case, with particular preference, the C3-12-α-olefin is an olefin selected from the group propene, 1-butene, 1-pentene, 1-hexene, 1-octene, 1-decene and/or 1-dodecene, and/or the non-conjugated diene preferably selected from the group bicycle is [2.2.1]heptadiene, hexa-1,4-diene, dicyclopentadiene and/or, in particular, 5-ethylidenenorbornene.

Suitability as a constituent for component (b) is also possessed, furthermore, by ethylene-acrylate copolymers comprising the further monomers as comonomer.

Other possible forms as constituents for component (b) are the ethylene-propylene copolymers and ethylene-butylene copolymers and/or mixtures (blends) which comprise such systems.

All of the copolymers (b) described above may in addition to the stated constituents further comprise constituents with dicarboxylic anhydride, dicarboxylic acid or dicarboxylic monoalkyl ester groups, in a concentration sufficient for effective attachment to the ionpolyamide (a).

These constituents with dicarboxylic anhydride, dicarboxylic acid or carboxylic acid groups are either grafted in a grafting reaction onto the main-chain polymer, in which case further monomers may be present during the grafting reaction, or are introduced into the MAH-IMP by copolymerization of an unsaturated dicarboxylic anhydride, an unsaturated dicarboxylic acid or an unsaturated dicarboxylic acid monoalkyl ester with other monomers as stated above, in which case reagents selected from the following group are preferably used for this purpose:
maleic acid, maleic anhydride, maleic acid monobutyl ester, fumaric acid, aconitic acid and/or itaconic anhydride. With preference, 0.1 to 5.0 wt % of an unsaturated anhydride is grafted onto the impact modifying component as a constituent of (b), or the unsaturated dicarboxylic anhydride or precursor thereof is grafted on together with a further unsaturated monomer. Generally speaking, the degree of grafting is preferably in a range of 0.2-3.0%, especially preferably in a range of 0.3-2.0%. Also possible as a constituent of component (b) is a mixture of an ethylene-propylene copolymer and an ethylene-butylene copolymer, preferably with a degree of maleic anhydride grafting (degree of MAH grafting) in the range of 0.3-0.9%.

The possible systems indicated above for component (b) may also be used in mixtures.

Furthermore, component (b) may possess further constituents, which possess functional groups, such as epoxy, oxazoline, carbodiimide, isocyanate, silanol and carboxylate groups, for example, or may comprise combinations of two or more of the stated functional groups. Monomers which carry these functional groups can be bonded onto the elastomeric polyolefin by copolymerization or grafting.

Furthermore, the IMPs based on the olefin polymers may also have been additionally modified by grafting with an unsaturated silane compound, e.g. vinyltrimethoxysilane, vinyltriethoxysilane, vinyltriacetosilane, methacryloyloxypropyltrimethoxysilane or propenyltrimethoxysilane.

The elastomeric polyolefins are random, alternating or segmented copolymers with a linear, branched or core-shell structure, and comprise functional groups which are able to react with the end groups of the polyamides, resulting in sufficient compatibility between the polyamide and IMP.

The IMPs of the invention therefore include homopolymers or copolymers of olefins, such as ethylene, propylene and but-1-ene, for example, or copolymers of olefins and copolymerized monomers, such as vinyl acetate, (meth)acrylic esters and methylhexadiene, which comprise MAH in the side chain (by grafting reaction) or in the main chain (by copolymerization).

Examples of crystalline olefin polymers are low-, medium- and high-density polyethylenes, polypropylene, polybutadiene, poly-4-methylpentene, ethylene-propylene block or random copolymers, ethylene-methylhexadiene copolymers, propylene-methylhexadiene copolymers, ethylene-propylene-butene copolymers, ethylene-propylene-hexene copolymers, ethylene-propylene-methylhexadiene copolymers, poly(ethylene-vinyl acetate) (EVA), poly(ethylene-ethyl acrylate) (EEA), ethylene-octene copolymer, ethylene-butene copolymer, ethylene-hexene copolymer, ethylene-propylene-diene terpolymers and also combinations of the stated polymers.

Examples of commercially available impact modifiers which may be used as part of the constituents of component (b) are:
TAFMER MC201: g-MAH (0.6%) blend of 67% EP copolymer (20 mol % propylene)+33% EB copolymer (15 mol % but-1-ene) Mitsui Chemicals, Japan.
TAFMER MHSO10: g-MAH (0.6%) ethylene-butylene copolymer; Mitsui.
TAFMER MH7010: g-MAH (0.7%) ethylene-butylene copolymer; Mitsui.
TAFMER MH7020: g-MAH (0.7%) EP copolymer, Mitsui.
EXXELOR VA1801: g-MAH (0.7%) EP copolymer; Exxon Mobil Chemical, US.
EXXELOR VA1803: g-MAH (0.5-0.9%) EP copolymer, amorphous, Exxon.
EXXELOR VA1810: g-MAH (0.5%) EP copolymer, Exxon
EXXELOR MDEX 94-11: g-MAH (0.7%) EPDM, Exxon.
FUSABOND MN493D: g-MAH (0.5%) ethylene-octene copolymer, DuPont, US.
FUSABOND A EB560D (g-MAH) ethylene-n-butyl acrylate copolymer, DuPont.
ELVALOY, DuPont.

Also preferred is an ionsomer in which the polymer-bonded carboxyl groups are joined to one another wholly or partly by metal ions.

Particularly preferred polymers are copolymers of butadiene with styrene that have been functionalized by grafting with maleic anhydride, apolar or polar olefin homopolymers and copolymers formed by grafting with maleic anhydride, and carboxylic acid-functionalized copolymers such as poly(ethene-co-(meth)acrylic acid) or poly(ethene-co-1-olefin-co-(meth)acrylic acid), in which some of the acid groups are neutralized with metal ions.

In component (b), the fraction of C2-C12 alkenes, in branched or unbranched form, or a mixture thereof, preferably the fraction of ethylene, propylene, butylene or a mixture thereof (considered as a whole in the case of a mixture) is preferably in the range of 50-95 wt %, more preferably in the range from 65 to 93 wt %, and very preferably in the range of 80-95 wt %, or 85 to 94 wt %, with only ethylene preferably being present in particular.

According to another preferred embodiment, in component (b), the fraction of C2-C3 alkenes, or of a mixture thereof (considered as a whole in the case of a mixture), is in the range of 50-95 wt %, preferably in the range from 65 to 93 wt %, and more preferably in the range of 80-95 wt %, or 85 to 94 wt % (in this case, longer-chain alkenes may additionally be present but are indeed not counted in the stated weight percentages, since those percentages take account only of ethylene and propylene).

Furthermore, the proposed polyamide moulding composition for the coating of the metal element optionally comprises the stated component (c) composed of an aliphatic polyamide different from the polyamide (a). The polyamides (c) are preferably not based on cycloaliphatic diamines and/or cycloaliphatic dicarboxylic acids. This component is preferably selected from the following group: polyamide 6, polyamide 10, polyamide 12, polyamide 1212, polyamide 1012, polyamide 1210, polyamide 46, polyamide 66, polyamide 612, polyamide 126, polyamide 106, polyamide 610, polyamide 1010, polyamide 614, polyamide 618, polyamide 1014, polyamide 1018, polyamide 1214, polyamide 1218 and also copolyamides or mixtures thereof.

Preferably component (c) is an aliphatic polyamide whose chain length is adapted to the chain length of the diamines and/or dicarboxylic acids of component (a). Preferably, for example, if component (a) is selected as MACM12 and/or MACMI/12, component (c) is polyamide 12, and may be present, for example, in a weight fraction of 10-20 wt %.

Furthermore, the proposed polyamide moulding composition for the coating of the metal element may comprise component (d). This component is preferably an additive selected from the following group: UV stabilizers, heat stabilizers, radical scavengers, antioxidants, processing aids, inclusion inhibitors, lubricants, mould-release auxiliaries, plasticizers, antistats, fillers such as, in particular, particulate fillers, including nanoscale fillers and/or adjuvants, and also fibrous fillers, especially glass fibres, flame retardants, especially halogen-free flame retardants, dyes, pigments, residuals from polymerization processes such as catalysts, salts and derivatives thereof or mixtures thereof.

The polyamide moulding composition for the coating of the metal element preferably comprises no flame retardant based on red phosphorus or magnesium hydroxide. Preferred phosphorus-containing flame retardants are metal phosphinates, more particularly calcium, aluminium or zinc phosphinates, which may optionally be used in combination with synergists, such as melamine cyanurate, for example.

According to a further preferred embodiment, the metal element of the layer structure is made of a metal selected from the following group: aluminium, copper, silver, zinc, iron, steel, or mixtures or alloys thereof. The surface in this case may have undergone active or passive oxidation and/or galvanizing.

The present invention relates in particular to layer structures having the following constructions:
metal element/polyamide layer;
metal element/polyamide layer/further layer;
metal element/further layer/polyamide layer;
where the stated further layer is based to an extent of at least 50 wt % on a thermoplastic moulding composition which is different from the polyamide moulding composition, and where further layers may additionally be disposed on the layer remote from the metal element. Preferably the metal element is covered by the polyamide layer completely or, in the case of an elongate metal element, at least completely around the circumference.

The polyamide layer is preferably formed such that it bears immediately adjacently and without an additional adhesion-promoting layer on the metal element. Bearing directly also includes situations in which the metal element has an oxide layer on the surface, and situations in which the metal element borders the polyamide layer directly, without an oxide layer.

According to a further preferred embodiment of the present invention, the metal element is a metal profile, more particularly a continuous metal profile, preferably in the form of a wire or flat conductor, which is covered on the outside preferably over the entire circumference of the polyamide layer. This conductor may also be a hollow conductor. With particular preference, a conductor of this kind is an electrical conductor, in which case preferably the thickness of the polyamide layer, measured perpendicular to the direction of principal extent of the conductor, is in the range of 0.1-2 mm, preferably in the range of 0.25-0.75 mm. In the case of a cylindrical wire, the core of a conductor of this kind typically has a diameter in the range of 0.2-6 mm, preferably in the range of 0.2-4 mm. In the case of a flat conductor, it typically has a width in the range of 10-30 mm and a thickness in the range of 2-8 mm.

The layer structure is preferably an electrical lead for motor vehicles in the low-voltage sector, and the present invention relates to the use of such a layer structure for such purposes. This means that the electrical conductor is intended and/or used for transporting a voltage of not more than 60 V in the case of direct current or a voltage of not more than 42 V in the case of alternating current. Particularly preferred applications of the layer structure and designs of the layer structure are as follows: battery cables for motor vehicles, and positive battery cables.

Moreover, the present invention relates to a method for producing a layer structure, as set out above, which is preferably characterized in that the metal element is coated with the polyamide layer in an extrusion process, preferably around the entire circumference of the metal element, preferably in the form of a continuous profile, more particularly in the form of a wire or flat conductor, preferably by the continuous profile, supplied from a roll, being passed jointly through an extrusion die with the material of the polyamide layer. Prior to extrusion coating, the adhesion of the metal element to the polyamide layer is improved preferably by means of cleaning baths, which may comprise solvents and/or acidic or alkaline aqueous solutions, and is cleaned and degreased, and subsequently dried and preheated to a temperature in the range from 130 to 250° C., preferably 150 to 230° C., especially preferably to 170 to 220° C. This heating of the metal element is accomplished preferably using hot air, flaming or microwaves (high-frequency preheating).

The polyamide layer, accordingly, is preferably not a film or a hose, which is produced separately prior to joining to the metal element, for example, and forms a self-supporting structure, and is subsequently applied directly or indirectly to the metal element, using an adhesion promoter or by means of partial melting, softening or contracting.

The present invention further relates to the use of a polyamide moulding composition in the form of a mixture consisting of the following components:

(a) an amorphous polyamide based on cycloaliphatic diamines, cycloaliphatic dicarboxylic acids, or both cycloaliphatic diamines and cycloaliphatic dicarboxylic acids, or a mixture of such amorphous polyamides, having a glass transition temperature (Tg) of at least 130° C.;
(b) a polyolefin based on
  C2-C5 alkenes, in branched or unbranched form, styrene, or a mixture thereof, and additionally
  at least one monomer selected from the following group: maleic anhydride, glycidyl acrylate, glycidyl methacrylate, acrylic acid, methacrylic acid, or a mixture of such monomers;
(c) an aliphatic polyamide different from (a), or a mixture of such polyamides;
(d) additives;
with the proviso that the fraction of components (c) and (d) may also be zero, and with the proviso that the sum of the components (a)-(d) makes 100 wt %,
for generating a polyamide layer on a metal element, more particularly for producing an electrical conductor insulated with the polyamide layer. The further specifications of components (a)-(c) as set out above in connection with the multilayer structure apply equally and analogously for the use encompassed by the invention as well. Here as well it is preferably not the case that in a first step the polyamide layer is produced as a self-supporting film or as a self-supporting tube and is subsequently joined to the metal element. Preferably, therefore, the issue is not one of using the polyamide layer as a film or tube, but instead of applying the polyamide moulding composition directly to the metal element from the liquid-melt phase (extrusion, dipping bath, etc.), or alternatively to dispose the polyamide moulding composition in solid form (powder, pellets) on the metal element and then converting it directly to the polyamide layer on said element. Preferably, then, the uses in question are those in which the polyamide layer is generated in situ on the metal element, something which then in turn ensures optimum adhesion, preferably without the use of an adhesion promoter or of an adhesion-promoting interlayer. Further embodiments are specified in the dependent claims.

BRIEF DESCRIPTION OF THE DRAWINGS

Preferred embodiments of the invention are described below with reference to the drawings, which serve solely for elucidation and should not be interpreted as imposing any restriction. In the drawings.

DESCRIPTION OF PREFERRED EMBODIMENTS

Figure 1:
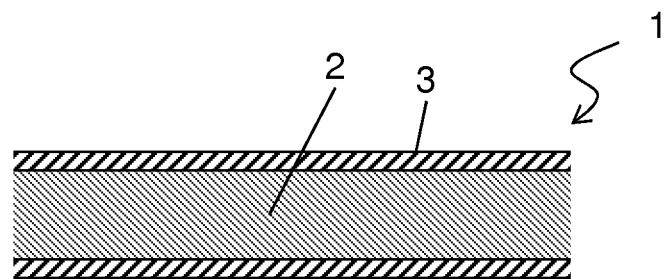
FIG. 1 shows a central longitudinal section along the line X-X as per FIG. 2a by an electrical conductor.
Figure 2:
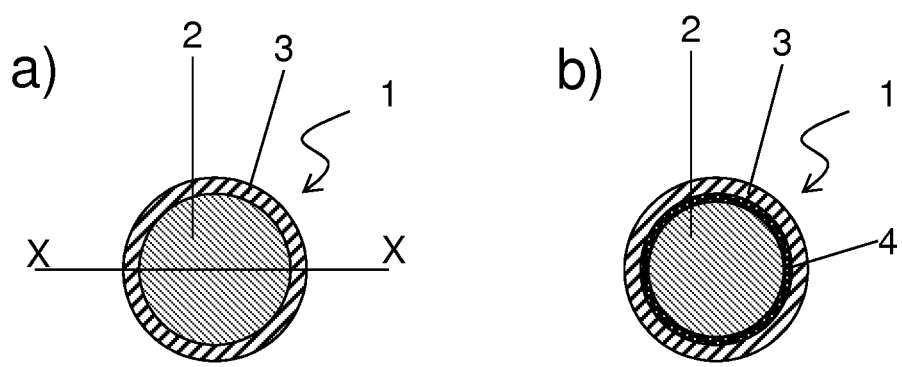
FIG. 2 shows sections perpendicular to the direction of principal extent of electrical conductors, where a) shows a section through an electrical conductor having a circular core and no interlayer, b) shows a section through an electrical conductor with a circular core and an interlayer, and c) shows a section through a flat conductor without an interlayer.

In order to document the advantageous properties of the multilayer structure according to the present invention, structures were built of the kind shown schematically in FIGS. 1 and 2. FIG. 1 here shows a section parallel to the running direction of a cylindrical electrical conductor 1 (section along line X-X in FIG. 2a). The conductor possesses a central core 2 of aluminium having a diameter of in this case 4 mm Surrounding the lateral area of this electrical metal conductor, and directly adjacent to this lateral area, there is a polyamide layer 3 around the entire circumference, said layer in this case having a thickness of 0.5 mm.

FIG. 2a shows an incised section into such a conductor, vertical to the running direction, revealing the circular cross-sectional area of the core 2. Likewise apparent is how the polyamide layer surrounds the entire circumference.

An alternative possibility is to arrange a further layer 4 between the polyamide layer 3 and the central core 2. This further layer may be an adhesion promoter layer or a varnish layer; likewise possible is galvanizing or an actively produced oxide layer. This situation is shown in the sectional representation of FIG. 2b.

The core 2 can in principle have any desired cross-sectional area. Accordingly, for example, square cross-sectional areas or oval cross-sectional areas are among those conceivable. FIG. 2c shows the further possibility of a rectangular cross-sectional area, in the form of what is called a flat conductor. Here, customarily, the width of the conductor is 10 to 20 mm and the height is 3 to 5 mm. For storage in NaCl solution under tension, a flat aluminium conductor with a cross-sectional metal area of 14×4.1 mm is used; the thickness of the insulating polyamide layer is approximately 0.5 mm.

For test purposes, conductors were produced as follows: A compact aluminium wire with a diameter of 4.0 mm and a flat aluminium conductor profile with dimensions of 14×4.1 mm, in each case made from pure aluminium (Al 99.5) were degreased and dried prior to jacketing. The aluminium conductors were subsequently heated by flaming or microwave and extrusion-coated with the polyamide variants on a wire jacketing line (NOUA or ROUA) with a layer thickness of 0.5 mm Table 1 summarizes the extrusion coating parameters.

The cross-sectionally circular aluminium wire (diameter 4 mm) was jacketed on a Nokia Cable Machinery SCL—20 line (NOUA), which was equipped as follows:
Extruder: MPP30-24D-305
Screw diameter 30 mm, screw length L/D 25:1
Extrusion head: Nokia Cable Machinery extrusion cross-head NXH 3, die diameter 10.0 mm, core diameter 6.0 mm.
Cooling bath water temperature 30° C., distance of die from cooling bath 85 cm Conductor preheating by flaming with annular flaming nozzle, propane-oxygen burner.

The jacketing of the cross-sectionally flat aluminium profile (14×4.1 mm) was carried out using a Rosendahl jacketing line (ROUA) for electrical leads, the line being equipped as follows:
Extruder: ROEX 60/24D
Screw diameter 60 mm, screw length L/D 25:1
Extrusion head: Rosendahl RX extrusion cross-head with bypass;

Pressure jacketing: the aluminium profile is jacketed with the melt within the die channel.
High-frequency preheating (microwave preheating)
Cooling bath water temperature 15° C.

TABLE 1

| | Temperature extruder zones [° C.] | Temperature head/die [° C.] | Take-off rate [m/min] | Aluminium conductor preheating [° C.] |
|---|---|---|---|---|
| B1, B2 of NOUA | 240-270 | 270 | 5 | 170 and 200 |
| B1, B2 of ROUA | 240-270 | 270 | 25 | 217 |
| VB1, VB2 of NOUA | 230-240 | 240 | 5 | 170 and 200 |
| VB1, VB2 of ROUA | 220-240 | 235 | 25 | 175 |

The construction and the properties measured on the resulting conductors in the relevant tests are summarized in the table below (Table 2):

| Components | Unit | B1 | B2 | VB1 | VB2 |
|---|---|---|---|---|---|
| P-1 | wt % | 87.6 | | | |
| P-2 | wt % | | 68.5 | | |
| P-3 | wt % | | 16 | 100 | 80 |
| P-4 | wt % | 12.4 | | | |
| P-5 (Surlyn) | wt % | | 15.5 | | |
| P-6 | wt % | | | | 20 |
| MVR (275° C./5 kg) | cm³/10 min | 18 | 28 | | |
| Tensile test on ISO tensile specimens | | | | | |
| Tensile E-modulus | MPa | 1300 | 1450 | 1500 | 1000 |
| Breaking strength | MPa | 45 | 44 | 55 | 43 |
| Elongation at break | % | 120 | 120 | 280 | 240 |
| Impact strength 23° C. | kJ/m² | o range | o range | o range | o range |
| Notched impact strength 23° C. | kJ/m2 | 56 | 47 | 5 | 75 |
| Tensile test on films | | | | | |
| Elasticity modulus | MPa | 1400 | 1410 | 1030 | ng |
| Yield stress | MPa | 48 | 47 | 36 | ng |
| Breaking stress | MPa | 58 | 57 | 60 | ng |
| Elongation at rupture | % | 130 | 160 | 290 | ng |
| Flexural test after 3000 h at 125° C., 5 mm bending radius | kV | kV | kV | kV | kV |
| Conductor fit (Al 4 mm) preheating: 170° C. | | o | n | o | o |
| Conductor fit (Al 4 mm) preheating: 200° C. | | o | o | h | h |
| Storage in NaCl solution under tension (48 V), 85° C., 1000 h | | Pass | Pass | Fail | Fail |
| Voltage resistance 1 min, 1000 V | | No breakdown | No breakdown | Fail | Fail | kV: no change on the surface apparent to the eye, especially no cracking
ng: not measured o: optimum force for stripping the insulation (jacketing) according to LV112-1
n: too low (Electrical leads for motor vehicles) and ISO 6722-1 (7.2)
h: too high The materials used here were as follows:

P-1 Polyamide MACM12, glass transition temperature Tg (dry) of 154° C., Tg (after conditioning as per ISO 1110) of 108° C., $\eta_{rel}$=1.8, $\Delta$Hm<4 J/g.

P-2 Polyamide ACMI/12 with an LC12 fraction of 34 wt %, Tg (dry)=155° C., Tg (after conditioning as per ISO 1110) of 112° C., $\eta_{rel}$=1.8, $\Delta$Hm<4 J/g.

P-3 Polyamide 12, Tm=178° C., =1.96

P-4 Lotader AX 8840 (ethylene-co-GMA, random copolymer of 92% ethylene and 8% glycidyl methacrylate), melting point: 109° C., Shore hardness: A 92, Arkema (France)

P-5 Surlyn 9320, ethylene-acrylic acid copolymer 9-12% methacrylic acid partially neutralized with zinc ions, DuPont, USA.

P-6 Tafmer MC-201, mixture of EP and EB copolymer (67/33) grafted with MAH (0.6%), MFR (230° C. at 2.16 kg): 1.3 g/10 min Density: 0.88 g/cm³. Shore hardness: A 73, Mitsui, Japan.

The measurements were carried out in accordance with the following standards and on the following test specimens.

The tensile E-modulus (elasticity modulus) was determined according to ISO 527 with a tensioning rate of 1 mm/min; the yield stress, the breaking strength and the elongation at break were determined according to ISO 527 with a tensioning rate of 50 mm/min at a temperature of 23° C., the test specimen used being an ISO tensile specimen, standard: ISO/CD 3167, type Al, 170×20/10×4 mm.

Tensile test on films was carried out according to ISO 527-3 on specimens punched from films (longitudinally relative to the direction of extrusion), with a testing speed of 100 mm/min at 23° C. The specimens had a thickness of 0.5 mm and a cross-sectional width of 6.2 mm Prior to the tensile testing, the punched specimens were stored for 14 days at 20° C. and 50% relative humidity.

Impact strength and Charpy notched impact strength were measured according to ISO 179 on an ISO test specimen, standard: ISO/CD 3167, type B1, 80×10×4 mm at a temperature of 23° C.

The thermal characteristics (melting temperature (Tm), enthalpy of fusion (ΔHm), glass transition temperature (Tg)) were determined on the basis of the ISO Standard 11357-11-2 on pellets. The Differential Scanning calorimetry (DSC) was carried out with a heating rate of 20° C./min. For the glass transition temperature (Tg), the temperature for the mid-stage or the point of inflection is reported.

The relative viscosity ($\eta_{rel}$) was measured according to DIN EN ISO 307 using 0.5 wt % strength m-cresol solutions at 20° C. The sample used is in the form of pellets.

The MVR (Melt Volume-flow Rate) is determined according to ISO 1133 at 275° C. under a load of 5 kg, on pellets.

Electrical properties on water storage: the insulation resistance during water storage (concentration of sodium chloride in water: 1 wt %), determined according to ISO 6722-1, must amount to at least $10^9$ Ωmm. This value is measured every 7 days. The conductor resistance on a lengthwise basis must not deviate by more than 10% from the initial value. Moreover, there must be no cracks in the insulation layer, and the colour of the insulation must still be perceptible after the test.

A test specimen with a conductor cross section of 14×4.1 mm and of sufficient length (2.5 m) is wound in 10 turns centrally onto a mandrel having a diameter of 125 mm. The test lead is stripped by 25 mm at each end and the mandrel is removed. The test specimen is connected to the positive terminal of a 48 V direct current source, and stored in the salt solution in a glass test vessel at 85±5° C. for 1000 hours with about 2 m of the test specimen being fully immersed. The negative terminal is connected to a copper electrode having a surface area of 100 cm². The test vessel, filled with 2-5 liters of the sodium chloride solution, is externally heated uniformly via a conditioning bath. Care should be taken to ensure that the test specimen and the copper electrode do not come into contact with one another Immediately after water storage, the test specimens are subjected to a voltage resistance test (1 kV, 1 minute).

Flexural test after heat storage: a jacketed aluminium wire with a diameter of 4 mm and 0.5 mm of jacketing (external diameter: 5 mm) is stored at 125° C. in a forced air oven for 3000 hours. After it is cooled, the aluminium wire thus treated is bent over a number of windings onto a 10 mm mandrel (radius: 5 mm) The jacketing is then subjected to visual inspection for cracking or other changes.

Conductor Fit:

For leads which are to be stripped of their insulation, at least 20 mm of the insulation must be easily and cleanly removable using commercially available equipment. The forces required to remove the insulation with a length of 50±1 mm must lie within the limits specified in LV 112-1 (Electrical leads for motor vehicles) or those agreed with the cable manufacturer. The sample is stripped over a length of 50±1 mm, and the stripped end of the conductor is pulled through a metal plate including a hole of conductor diameter+0.1 mm, with a pulling speed of 100 mm/min. For the purpose of determining the conductor fit, the jacketed aluminium wire with circular cross section and a conductor diameter of 4 mm is used. If the pulling force determined in this way is within the limits stated above, the conductor fit is reported in Table 2 as being optimum (o), as too low (n) if it is below the limits, or as too high (h) if it is above them.

Discussion of the Results:

The electrical conductor consisting of aluminium and a polyamide layer in accordance with Examples B1 and B2, with the experimental construction indicated, passes the hot water storage test with 1% sodium chloride (NaCl) at 85° C. under a direct voltage of 48 volts over 1000 hours. The subsequent voltage breakdown test of 1000 V over 1 minute is likewise passed in Examples B1 and B2. This is not the case for conventional polyamide 12 moulding compositions as incorporated, for example, into Comparative Examples B1 and B2. The mechanical requirements asked of the insulating material in relation to applications in motor vehicles are met by the moulding compositions of Examples VB1 and VB2—in particular, in the flexural test after long-term thermal storage, no cracking or other surface changes are observed, and conductor fit is found to be optimum on preheating of the metal element to 200° C.

LIST OF REFERENCE NUMERALS 1 electrical conductor
2 metallic layer, core
3 polyamide layer
4 interlayer

The invention claimed is:

1. A layer structure—having at least one metal element—and at least one polyamide layer—arranged at least regionally on the metal element,
wherein
the polyamide layer consists of a polyamide moulding composition which is a mixture consisting of the following components:
(a) a polyamide based on cycloaliphatic diamines, cycloaliphatic dicarboxylic acids, or both cycloaliphatic diamines and cycloaliphatic dicarboxylic acids, or a mixture of such polyamides, having a glass transition temperature ($T_g$) of at least 130° C.;
(b) a polyolefine based on
C2-C12 alkenes, in branched or unbranched form, or a mixture thereof, and additionally
at least one monomer selected from the group consisting of: maleic anhydride, itaconic anhydride, glycidyl acrylate, glycidyl methacrylate, acrylic acid, methacrylic acid, vinyl acetate, C1-C12 alkyl acrylates, C1-C12 alkyl methacrylates, substituted or unsubstituted styrene and a mixture thereof;
(c) an aliphatic polyamide different from (a), or a mixture of such polyamides;
(d) additives;
with the proviso that the fraction of components (c) and (d) may be zero, and with the proviso that the sum of the components (a)-(d) makes 100 wt %.

2. The layer structure according to claim 1, wherein the polyamide moulding composition is a mixture of the stated components (a)-(d) with the following fractions:
(a) 60-90 wt % of a polyamide based on cycloaliphatic diamines, cycloaliphatic dicarboxylic acids, or both cycloaliphatic diamines and cycloaliphatic dicarboxylic acids, or a mixture of such polyamides, having a glass transition temperature ($T_g$) of at least 130° C.;
(b) 10-40 wt % of a polyolefin based on
C2-C12 alkenes, in branched or unbranched form, or a mixture thereof and additionally
at least one monomer selected from the group consisting of: maleic anhydride, itaconic anhydride, glycidyl acrylate, glycidyl methacrylate, acrylic acid, methacrylic acid, vinyl acetate, C1-C12 alkyl acrylates, C1-C12 alkyl methacrylates, substituted or unsubstituted styrene and a mixture thereof;
(c) 0-20 wt % of an aliphatic polyamide different from (a), or a mixture of such polyamides;
(d) 0-25 wt % of additives;
with the proviso that the sum of the components (a)-(d) makes 100 wt %.

3. The layer structure according claim 1, wherein the amorphous polyamide or polyamides of component (a) is or are composed of the following building blocks:
(a1) 50 to 100 mol % of a cycloaliphatic diamine or mixtures thereof and
(a2) 0 to 50 mol % of an aliphatic or aromatic diamine having 4 to 36 carbon atoms, or mixtures thereof, based in each case on the molar entirety of diamines, and
(a3) one or more than one aliphatic or cycloaliphatic dicarboxylic acid having 4 to 36 carbon atoms,
(a4) one or more than one aliphatic or aromatic lactam or aminocarboxylic acid having 4-36 carbon atoms.

4. The layer structure according to claim 1, wherein component (a) comprises a polyamide selected from the group consisting of: MACM9, MACM10, MACM11, MACM12, MACM13, MACM14, MACM16, MACM18, PACM9, PACM10, PACM11, PACM12, PACM13, PACM14, PACM16, PACM18, TMDC9, TMDC10, TMDC11, TMDC12, TMDC13, TMDC14, TMDC15, TMDC16, TMDC17, TMDC18, MACMI/12, MACMT/12, MACMI/MACMT/12, 6I/6T/MACMI/MACMT/12, 6I/MACMI/MACMT, 6I/PACMI/PACMT, 6I/6T/MACMI, MACMI/MACM36, 12/PACMI, 12/MACMT, 6/PACMT, 6/IPDT, 10I/10T/BACI/BACT, MACM9-18/PACM9-18, MACM9-18/TMDC9-18, TMDC9-18/PACM9-18, and mixtures thereof.

5. The layer structure according to claim 1, wherein in component (b) the fraction of C2-C12 alkenes, in branched or unbranched form, or a mixture thereof, is in the range of 50-95 wt %,
or in that in component (b) the fraction of C2-C3 alkenes, or a mixture thereof, is in the range of 50-95 wt %.

6. The layer structure according to claim 1, wherein component (b) as polyolefin is selected from the following group:
polyolefin of ethylene and glycidyl methacrylate;
polyolefin of ethylene, vinyl acetate and glycidyl methacrylate;
polyolefin of ethylene, methyl acrylate and glycidyl methacrylate;
polyolefin of ethylene, butyl acrylate and glycidyl methacrylate;
or a mixture of such polyolefins.

7. The layer structure according to claim 1, wherein component (c) is selected from the group consisting of: polyamide 6, polyamide 10, polyamide 12, polyamide 1212, polyamide 1012, polyamide 1210, polyamide 46, polyamide 66, polyamide 612, polyamide 126, polyamide 106, polyamide 610, polyamide 1010, polyamide 614, polyamide 618, polyamide 1014, polyamide 1018, polyamide 1214, polyamide 1218 and copolyamides and mixtures thereof.

8. The layer structure according to claim 1, wherein component (d) is selected from the group consisting of: UV stabilizers, heat stabilizers, radical scavengers, antioxidants, processing aids, inclusion inhibitors, lubricants, mould-release auxiliaries, plasticizers, antistats, fillers including particulate fillers, including nanoscale fillers and/or adjuvants, and also fibrous fillers, including glass fibres, flame retardants, including halogen-free flame retardants, dyes, pigments, residuals from polymerization processes including catalysts, salts and derivatives thereof and mixtures thereof.

9. The layer structure according to claim 1, wherein the metal element consists of a metal selected from the following group: aluminium, copper, silver, zinc, iron, steel, or mixtures and/or alloys thereof, it being possible for the surface to be in oxidized and/or galvanized form.

10. The layer structure according to claim 1, wherein the layer structure has one of the following constructions:
metal element/polyamide layer;
metal element/polyamide layer/further layer;
metal element/further layer/polyamide layer;
where the stated further layer is based to an extent of at least 50 wt % on a thermoplastic moulding composition which is different from the polyamide moulding composition, and where further layers may additionally be disposed on the layer remote from the metal element.

11. The layer structure according to claim 1, wherein the metal element comprises a metal profile, which is covered by the polyamide layer.

12. The layer structure according to claim 11, wherein the metal element is an electrical conductor, wherein the thickness of the polyamide layer, measured perpendicularly to the direction of principal extent of the conductor, is in the range of 0.1-2 mm.

13. The layer structure according to claim 1, wherein component (b) is composed exclusively
of C2-C12 alkenes, in branched or unbranched form, or a mixture thereof, and additionally of at least one monomer selected from the group consisting of: maleic anhydride, itaconic anhydride, glycidyl acrylate, glycidyl methacrylate, acrylic acid, methacrylic acid, vinyl acetate, C1-C12 alkyl acrylates, C1-C12 alkyl methacrylates, substituted or unsubstituted styrene, or a mixture of such monomers.

14. A method for producing a layer structure according to claim 1, comprising:
coating the metal element with the polyamide.

15. A method for generating a polyamide layer on a metal element comprising:
preparing a mixture of a polyamide moulding composition consisting of the following components:
(a) a polyamide based on cycloaliphatic diamines, cycloaliphatic dicarboxylic acids, or both cycloaliphatic diamines and cycloaliphatic dicarboxylic acids, or a mixture of such polyamides, having a glass transition temperature ($T_g$) of at least 130° C.;
(b) a polyolefine based on
C2-C12 alkenes, in branched or unbranched form, or a mixture thereof, and additionally
at least one monomer selected from the group consisting of: maleic anhydride, itaconic anhydride, glycidyl acrylate, glycidyl methacrylate, acrylic acid, methacrylic acid, vinyl acetate, C1-C12 alkyl acrylates, C1-C12 alkyl methacrylates, substituted or unsubstituted styrene or a mixture of such monomers;
(c) an aliphatic polyamide different from (a), or a mixture of such polyamides;
(d) additives;
with the proviso that the fraction of components (c) and (d) may be zero, and with the proviso that the sum of the components (a)-(d) makes 100 wt %, and coating the metal element with said polyamide moulding composition.

16. The layer structure according to claim 1, wherein the polyamide moulding composition is a mixture of the stated components (a)-(d) with the following fractions:
- (a) 65-90 wt % of a polyamide based on cycloaliphatic diamines, cycloaliphatic dicarboxylic acids, or both cycloaliphatic diamines and cycloaliphatic dicarboxylic acids, or a mixture of such polyamides, having a glass transition temperature ($T_g$) of at least 130° C.;
- (b) 10-20 wt %, of a polyolefin based on
  - C2-C12 alkenes, in branched or unbranched form, or a mixture thereof and additionally
  - at least one monomer selected from the group consisting of: maleic anhydride, itaconic anhydride, glycidyl acrylate, glycidyl methacrylate, acrylic acid, methacrylic acid, vinyl acetate, C1-C12 alkyl acrylates, C1-C12 alkyl methacrylates, substituted or unsubstituted styrene or a mixture of such monomers;
- (c) 10-20 wt %, of an aliphatic polyamide different from (a), or a mixture of such polyamides;
- (d) 0.1-5 wt %, of additives;
- with the proviso that the sum of the components (a)-(d) makes 100 wt %.

17. The layer structure according to claim 1, wherein the polyamide moulding composition is a mixture of the stated components (a)-(d) with the following fractions:
- (a) 65-90 wt % of a polyamide based on cycloaliphatic diamines, cycloaliphatic dicarboxylic acids, or both cycloaliphatic diamines and cycloaliphatic dicarboxylic acids, or a mixture of such polyamides, having a glass transition temperature ($T_g$) of at least 130° C.;
- (b) 10-20 wt %, of a polyolefin based on
  - C2-C5 alkenes, in branched or unbranched form, or a mixture thereof and additionally
  - at least one monomer selected from the group consisting of: maleic anhydride, itaconic anhydride, glycidyl acrylate, glycidyl methacrylate, acrylic acid, methacrylic acid, vinyl acetate, C1-C12 alkyl acrylates, C1-C12 alkyl methacrylates, substituted or unsubstituted styrene or a mixture of such monomers;
- (c) 10-20 wt %, of an aliphatic polyamide different from (a), or a mixture of such polyamides;
- (d) 0.1-5 wt %, of additives;
- with the proviso that the sum of the components (a)-(d) makes 100 wt %.

18. The layer structure according to claim 1, wherein the amorphous polyamide or polyamides of component (a) is or are composed of the following building blocks:
- (a1) 80-100 wt %, of a cycloaliphatic diamine, selected from the group consisting of: bis(4-amino-3-methylcyclohexyl)methane (MACM), bis(4-aminocyclo-hexyl) methane (PACM), bis(4-amino-3-ethylcyclohexyl) methane (EACM), bis(4-amino-3,5-dimethylcyclohexyl)methane (TMACM), 1,3-bis(aminomethyl)cyclohexane (BAC), 1,4-bis(aminomethyl)cyclohexane or mixtures thereof and
- (a2) 0-40 mol % of an aliphatic or aromatic diamine having 4 to 36 carbon atoms, or mixtures thereof,
- based in each case on the molar entirety of diamines, and
- (a3) one or more than one aliphatic or cycloaliphatic dicarboxylic acid having 8-18 carbon atoms,
- (a4) one or more than one aliphatic or aromatic lactam or aminocarboxylic acid having 10-18 carbon atoms, the fraction of component (a4) being 0 to 50 mol %, or 2-45 mol % or 3 to 35 mol %, based in each case on the sum of all monomers forming (a).

19. The layer structure according to claim 1, wherein component (a) comprises a polyamide selected from the following group: MACM10/PACM10, MACM12/PACM12 and MACM14/PACM14, or mixtures thereof.

20. The layer structure according to claim 1, wherein in component (b) the fraction of ethylene, propylene, butylene, or a mixture thereof, is in the range of 50-95 wt %, or in the range from 65 to 93 wt %, or in the range of 80-95 wt %, or 85 to 94 wt %,
- or in that in component (b) the fraction of C2-C3 alkenes, or a mixture thereof, is in the range of 65 to 93 wt %, or in the range of 80-95 wt %, or 85 to 94 wt %.

21. The layer structure according to claim 1, wherein component (b) as polyolefin is selected from the following group:
- polyolefin of ethylene and glycidyl methacrylate, with a glycidyl methacrylate content of 7 to 14 wt %, based on the sum of all monomers in the copolymer;
- polyolefin of ethylene, vinyl acetate and glycidyl methacrylate, 71-88 wt % ethylene, 5-15 wt % vinyl acetate and 7-14 wt % glycidyl methacrylate, based on the sum of all monomers in the copolymer;
- polyolefin of ethylene, methyl acrylate and glycidyl methacrylate, 56-73 wt % ethylene, 20-30 wt % methyl acrylate and 7-14 wt % glycidyl methacrylate, based on the sum of all monomers in the copolymer;
- polyolefin of ethylene, butyl acrylate and glycidyl methacrylate, 51-78 wt % ethylene, 15-35 wt % butyl acrylate and 7-14 wt % glycidyl methacrylate, based on the sum of all monomers in the copolymer;
- or a mixture of such polyolefins.

22. The layer structure according to claim 1, wherein the layer structure has one of the following constructions:
- metal element/polyamide layer;
- metal element/polyamide layer/further layer;
- metal element/further layer/polyamide layer;
  - where the stated further layer is based to an extent of at least 50 wt % on a thermoplastic moulding composition which is different from the polyamide moulding composition, and where further layers may additionally be disposed on the layer remote from the metal element, and
  - for the constructions metal element/polyamide layer and metal element/polyamide layer/further layer, the polyamide layer bears directly adjacently on the metal element without an additional adhesion-promoting layer.

23. The layer structure according to claim 1, wherein the metal element comprises a metal profile, in the form of a wire or flat conductor, which is covered over its entire extent by the polyamide layer.

24. The layer structure according to claim 11, wherein it comprises an electrical conductor, wherein the thickness of the polyamide layer, measured perpendicularly to the direction of principal extent of the conductor, is in the range of 0.25-0.75 mm.

25. The layer structure according to claim 1, wherein component (b) is composed exclusively
- of C2-C5 alkenes, in branched or unbranched form, or a mixture thereof, and additionally of at least one monomer selected from the group consisting of: maleic anhydride, itaconic anhydride, glycidyl acrylate, glycidyl methacrylate, acrylic acid, methacrylic acid, vinyl acetate, C1-C12 alkyl acrylates, C1-C12 alkyl methacrylates, substituted or unsubstituted styrene, or a mixture of such monomers.

26. The layer structure according to claim 1, wherein component (b) is composed exclusively
of C2-C5 alkenes, in branched or unbranched form, or a mixture thereof, and additionally of at least one monomer selected from the group consisting of: maleic anhydride, itaconic anhydride, glycidyl acrylate, glycidyl methacrylate, acrylic acid, methacrylic acid, vinyl acetate, C1-C12 alkyl acrylates.

27. A method for producing a layer structure according to claim 1, wherein the metal element is coated with the polyamide layer around the entire extent of the metal element, said metal element being in the form of a continuous profile.

28. A method for producing a layer structure according to claim 1, wherein the metal element is coated with the polyamide layer around the entire extent of the metal element, in the form of a wire or flat conductor, in an extrusion process.

29. A method for producing a layer structure according to claim 1, wherein the metal element is coated with the polyamide layer around the entire extent of the metal element, wherein a roller-supplied continuous metal profile is being guided together with the material of the polyamide layer through an extrusion die.

30. A method for generating an electrical conductor insulated with a polyamide layer, comprising:

preparing a mixture of a polyamide moulding composition consisting of the following components:
(a) a polyamide based on cycloaliphatic diamines, cycloaliphatic dicarboxylic acids, or both cycloaliphatic diamines and cycloaliphatic dicarboxylic acids, or a mixture of such polyamides, having a glass transition temperature ($T_g$) of at least 130° C.;
(b) a polyolefine based on
C2-C5 alkenes, in branched or unbranched form, or a mixture thereof, and additionally
at least one monomer selected from the group consisting of: maleic anhydride, itaconic anhydride, glycidyl acrylate, glycidyl methacrylate, acrylic acid, methacrylic acid, vinyl acetate, C1-C12 alkyl acrylates, C1-C12 alkyl methacrylates, substituted or unsubstituted styrene or a mixture of such monomers;
(c) an aliphatic polyamide different from (a), or a mixture of such polyamides;
(d) additives;
with the proviso that the fraction of components (c) and (d) may be zero, and with the proviso that the sum of the components (a)-(d) makes 100 wt %, and,
coating the electrical conductor with said polyamide moulding composition.

* * * * *